(No Model.)
J. J. CROOKE.
PROCESS OF AND APPARATUS FOR EXTRACTING GOLD AND SILVER FROM THEIR ORES.
No. 541,657. Patented June 25, 1895.
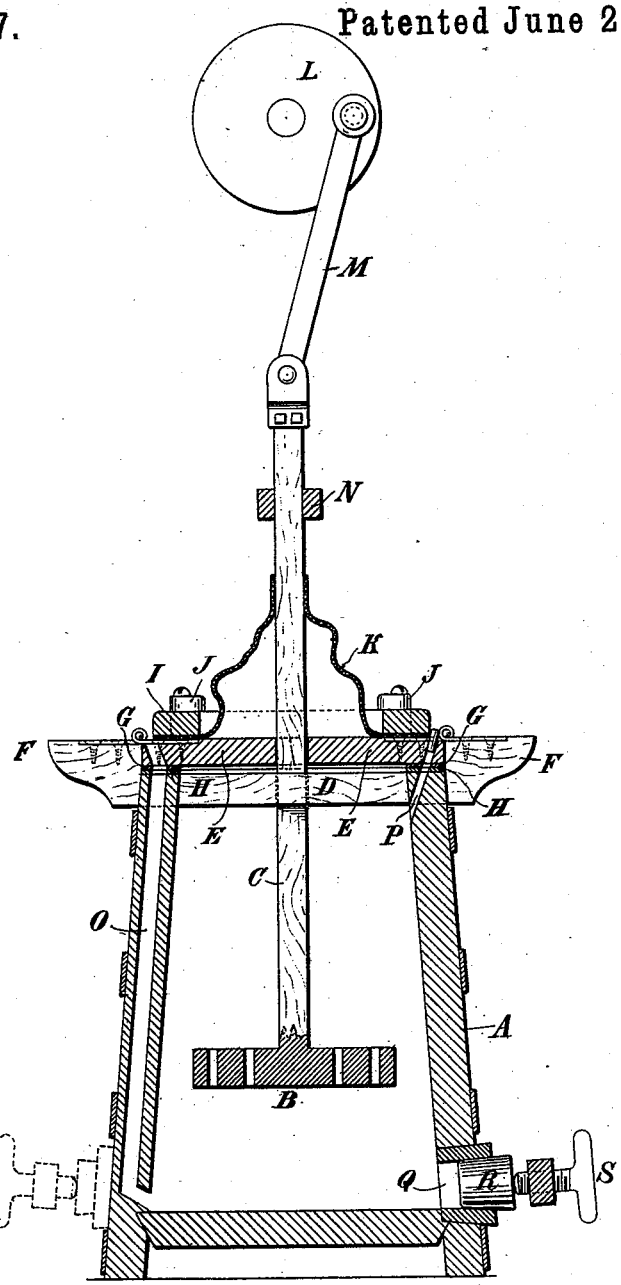
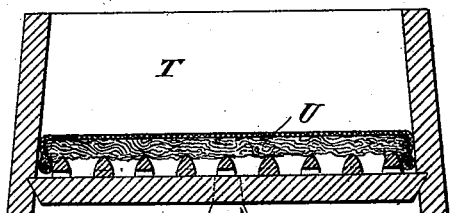
Witnesses:
Raphaël Netter
Ernest Hopkinson
Inventor:
John J. Crooke
by Duncan & Page Att'ys.

UNITED STATES PATENT OFFICE.

JOHN J. CROOKE, OF NEW YORK, N. Y.

PROCESS OF AND APPARATUS FOR EXTRACTING GOLD AND SILVER FROM THEIR ORES.

SPECIFICATION forming part of Letters Patent No. 541,657, dated June 25, 1895.

Application filed April 7, 1894. Serial No. 506,669. (No model.)

*To all whom it may concern:*

Be it known that I, JOHN J. CROOKE, a citizen of the United States, residing in the city, county, and State of New York, have invented certain new and useful Improvements in Processes of and Apparatus for Extracting Gold or Gold and Silver from Their Ores, of which the following is a specification, reference being had to the accompanying drawing, forming a part of the same.

The present invention relates to the treatment by chlorination of ores carrying gold or gold and silver, and is especially adapted to that class of ores which are rich in gold and are generally associated with a small quantity of silver and require roasting before chlorination.

The object of the invention is to make a more perfect extraction of both the gold and silver than has heretofore been practicable in working these ores in a large way, and also to materially reduce the time and expense of extraction; and the invention consists generally in processes and apparatus hereinafter more particularly described and claimed.

Chlorine has long been recognized as an efficient agent in the extraction of gold from its ores. It is especially useful in its application to refractory ores, in which the presence of sulphides, arsenides, tellurides and other compounds prevent the precious metals from readily amalgamating with mercury. The Plattner process, in which the pulverized, roasted and moistened ores are treated in an agitator with chlorine generated in a separate vessel and introduced into the agitator, has been extensively employed. This process, although an improvement on existing methods, rarely extracts more than from eighty to eighty-six per cent. of the assay value of the ores in gold and none of the silver.

I am also aware that modifications have been made in the Plattner process by which chlorine has been generated in the body or mass of the ore by mixing chloride of lime, or chloride of lime and chloride of sodium, with the ore reduced to a flowing pulp by the addition of water, and then introducing sulphuric acid to generate chlorine; and I am informed that by this modification the percentage of gold extracted has been increased to ninety and in some cases to ninety-two per cent. of the assay value of the ores while the silver has remained in the tailings.

It occurred to me that, as the chlorine, in the last named process, was liberated in direct contact with the ore, and was thereby available to act in its nascent condition, to convert the gold into a soluble chloride, the results should have shown a more perfect extraction of the gold, and I concluded there must be some defect in the process, in that the chlorine was not generated with sufficient force or power, or that the proper effect of the gas was in some way modified or prevented. Accordingly, I have made a careful study, supplemented with many experiments and tests, to discover the proper materials or compounds with which ores carrying gold and silver could be treated to generate chlorine freely and instantly, in the mass of the ore, so that while in its nascent condition it would be in intimate contact with the particles of gold and silver and would act to immediately convert them into chlorides.

As a result of my investigations I have discovered that manganic iron which generally contains a large but variable per cent. of binoxide of manganese associated with rock, and generally carries a small per cent. of silver, and is abundant in many gold and silver producing localities, can be successfully utilized, when mixed with the ores and chloride of sodium and the mass treated with a chlorine-generating acid, to produce or cause the rapid reactions to instantaneously liberate chlorine. I have also discovered that the use of a hot aqueous solution of chloride of sodium, preferably slightly acidulated with hydrochloric or sulphuric acid, as the liquid of the pulp or plasma, is of great advantage especially in the treatment of ores containing silver associated with gold for the reasons hereinafter set forth; and I have further discovered that the use of nitro-sulphuric acid introduced into the plasma as the chlorine-liberating agent is superior to sulphuric acid especially when used in connection with the plasma bath above referred to.

Based upon these discoveries and experiments I have devised, developed and practiced the following method or process of chlorinating ores carrying gold, or gold and silver.

The ores, pulverized preferably to about forty to fifty mesh, are calcined or roasted by any of the usual methods to insure the breaking up of any contained sulphides, arsenides or other compounds which would interfere with the process. After they have been drawn from the roasting furnace and have cooled down to about 150° Fahrenheit they are mixed with manganic iron and chloride of sodium in proportions depending upon the richness of the ores in gold and silver, and the quantity of manganese in the manganic iron. If the manganic iron contains about fifty per cent. of manganese, about ten per cent. of manganic iron and six per cent. of chloride of sodium in weight to the weight of the ores will be sufficient to charge each ton of ores containing from six hundred to eight hundred dollars in gold and the small quantity in silver generally associated in ores of this class. In making this mixture, and in order to obtain a more intimate union of the manganic iron and the chloride of sodium than would be the case if they were mixed separately with the ores, I prefer to first intimately mix the manganic iron and chloride of sodium with each other and grind them together with sufficient water to form a pulp, and then mix this mixture with the ores. It is here observed that, if the manganic iron employed contains considerably less than fifty per cent. of manganese a larger proportion than ten per cent. should be used, and also that the proportion of the mixture of manganic iron and chloride of sodium with the ores should be in excess of that actually required, as a small quantity of unconverted manganese and salt will do no harm. The mass, now containing pulverized ores, manganic iron and chloride of sodium, is charged into a digester containing a hot aqueous solution of about three per cent. of chloride of sodium slightly acidulated with hydrochloric or sulphuric acid, preferably the former, about one-fourth of one per cent. of hydrochloric or one-fourth of one per cent. of sulphuric acid being generally sufficient, the proportions of ore and solution being such as to form a pulp or plasma of about the consistency of molasses. The digester is provided with means for closing it substantially gas tight, and for introducing charges of acid from time to time, at or near its bottom, and with means for thoroughly agitating its contents, as hereinafter more fully described. Nitro-sulphuric acid, containing nine and one-half parts of sulphuric acid and one-half part of nitric acid, or sulphuric acid, but preferably the former, is introduced into the pulp or plasma, preferably at or near the bottom of the digester and in small charges and at frequent intervals of time. The quantity of acid required is generally about ten per cent. of the pulp depending largely, however, upon the richness of the ore and consequently the quantity of chlorine required to convert the gold and silver to chlorides. The pulp should be kept under constant agitation during the introduction of the acid in order to evenly distribute the chlorine through the plasma. As chlorine is nearly twice as heavy as air, its production can be readily controlled by the amount of acid introduced from time to time, so that in a properly constructed digester, but little free gas shall rise to the top of the plasma until the gold and silver have been converted into their chlorides. The advantage of the introduction of the acid in small charges at or near the bottom of the pulp is apparent, inasmuch as the chlorine is primarily generated at that point, and is carried upward through the pulp by the agitator, and by the time it reaches the top it has united with the gold and silver, and is no longer free. By this method of introducing the acid there results a considerable saving of chlorine over those usually employed. As the violent reactions brought about by the acid cause an increase of the temperature of the mass, its introduction should be sufficiently slow to prevent a rise of temperature above 165° to 170° Fahrenheit. When charges of six to eight tons are treated, from two to two and one-half hours are consumed in the acid stage, about ten to fifteen pounds of acid being introduced at intervals of from one to two minutes apart.

After sufficient chlorine has been liberated (the quantity depending upon the richness of the ore) to convert all the gold and silver into chlorides, the introduction of the acid is stopped, and a gentle agitation of the pulp is continued preferably from one half to three-quarters of an hour. If during this time the temperature should fall much below 165° Fahrenheit, it should be increased and kept at the desired point of 167° Fahrenheit, and this can be readily done by introducing steam under pressure. The time of treatment in the digester will generally be from three to three and one-half hours, but by testing a sample of the plasma it can readily be ascertained whether the gold and silver has all been converted into chlorides, and if not the operation should be continued longer.

When the conversion is complete the plasma is drawn from the digester into lixiviating tanks, provided with properly constructed filters, through which the solution carrying the gold and silver passes, and the filtrate may be delivered directly into a precipitating tank, in which the gold is precipitated by the use of sulphate of iron or other material adapted for this purpose. The solution deprived of its gold is then drawn or siphoned to another tank where the silver is recovered by the action of metallic copper, or by the use of other well known agents.

As my invention relates particularly to the operations directly connected with the chlorinating step of the process hereinbefore set forth, I will describe a form of digester which I prefer to use, and which is illustrated in the accompanying drawing in connection with lixiviating tanks, the several parts being shown in section.

In the drawing, A represents the digester, which in practice I make of a capacity for treating about eight tons of material. It is preferably circular in cross-section and in the form of a truncated cone, and, for the capacity above referred to, should be about six feet in diameter at its bottom and four feet at its top, and about eight feet high. It is provided with an agitator which consists of a perforated dasher B fixed to its shaft C, which works in bearings in the cross-piece D and passes through cover E, the latter being preferably made in two parts each hinged to projections F on the cross-piece. Packing rings or gaskets G, H, of rubber or other suitable material, form tight joints between the cover and the rim of the digester. A ring I is clamped tight down upon the cover E by means of the clamping buttons J, which turn upon the screws which secure them to the cover. A flexible cone-shaped hood K is secured at its lower edge to the under side of the ring I and serves to seal this joint while its upper edge is tightly secured to the shaft C, there being sufficient slack in the material of the hood to permit an upward throw of the shaft of about four feet without straining the hood. This hood can be made of strong canvas soaked in paraffine to make it gas tight.

The agitator may be caused to reciprocate by any desired mechanism, as by a wheel L, and connecting crank rod M, pivotally secured to the top of the shaft.

N is a fixed steadying guide through which the shaft passes.

The digester is further provided with a channel O extending through the cover E and downwardly through the side wall and communicating with the interior near the bottom of the digester, and is preferably about two and one-half inches in diameter, through which acid and steam can be admitted.

P is a channel communicating with the air, through which any excess of gas can escape and be removed by an attached hose or other means. The digester is also preferably provided with two large sluice doors Q and means for opening and closing tightly the same, as a plug R operated by a hand screw S. The interior walls of the digester as well as the dasher and shaft of the agitator are preferably made of wood and may be soaked or painted with paraffine or other gas and acid proof substance.

T T are lixiviating tanks located directly beneath the sluice doors of the digester to receive its contents, and are provided with filters U of any efficient construction. The capacity of each tank should be at least equal to that of the digester.

V is an exit by which the filtrate can be delivered directly into a precipitating tank not shown.

In the working of my process for extracting gold and silver from their ores, I use this digester in the following manner: About six hundred gallons of the hot aqueous and slightly acidulated solution heretofore described is drawn from a tank into the digester, and the agitator is started. The stock to be treated, containing the pulverized ores, manganic iron and chloride of sodium mixed in the proportions substantially as set forth and preferably heated to about 150° Fahrenheit is gradually fed, by a power conveyer or otherwise, into the digester till about eight tons has been received, and by the continued operation of the agitator which moves freely through the mass it will be quickly converted into a homogeneous pulp or plasma of about the consistency of molasses. The cover E is then closed and the ring I clamped in place. The acid is then introduced, preferably in charges of about ten to fifteen pounds, through the channel O and is delivered at the bottom of the digester and beneath the main body of the plasma. Chlorine is immediately liberated with great freedom and volume and is quickly and evenly distributed throughout the plasma by the operation of the agitator, the gradually contracting walls of the latter acting to concentrate the volume of gas and to somewhat retard its rise through the plasma, thereby affording sufficient time for its union with the gold and silver before it reaches the top of the digester. The action of the agitator not only distributes the chlorine as it is generated at the bottom of the digester throughout the plasma, but also, to a certain extent, distributes the acid so that small volumes of chlorine are liberated throughout the plasma and immediately in its nascent condition combine with the metals to reduce them to chlorides. This operation is continued by the repeated introduction of the charges of acid until sufficient chlorine has been liberated to convert the gold and silver into chlorides, generally requiring from two to two and one-half hours, after which the agitator should be moved more slowly to give a gentler agitation to the plasma for about one-half to three-quarters of an hour, during which time the temperature of the plasma should be kept at about 165° to 170° Fahrenheit. When the gold and silver has become converted into chlorides the sluice doors, Q, one or both, may be opened, and the entire contents of the digester be quickly discharged into the lixiviating tanks T T, and the digester being sluiced out with hot water (which should be also discharged into the lixiviating tanks) is ready to be recharged, and the above described operation repeated.

The solution, after it passes through the filter U, of the lixiviating tanks, should be received directly into a precipitating tank, and when most of the solution has passed the filter of the lixiviating tank the charge remaining on the filter should be thoroughly washed with hot water, until the filtrate gives no reaction for gold or silver, and this secondary filtrate should also be run into the precipitating tank, which now contains the gold and silver in solution. The gold is precipitated from the solution by any of the well known agents, as by sulphate of iron or carbon. The solution freed from the gold can then be siphoned into another tank and the silver contained therein be recovered by any well known method, as by exposing it to the action of metallic copper.

I have found that, by the use of the process and apparatus above described, I can extract, in a large way, as high as ninety-nine per cent. of the assay value of the gold and silver contained in refractory ores. I ascribe the efficiency of the process largely to the introduction of the manganic iron in the stock which, in my judgment, operates with the other agents to cause instantaneous reactions by which the chlorine is liberated with great power, and in its nascent condition is brought into direct contact with the metals to convert them into chlorides. I am of the opinion that the oxide of manganese in the manganic iron is present in a very comminuted condition, and that its action for this reason is much more potent than if it were in the condition of a pure peroxide. I am also satisfied that, when the proportions of the charge are properly adjusted, all of the chlorine in the chloride of sodium will be released and become available to convert the metals into chlorides of gold and silver.

As before stated, I prefer to use a hot aqueous solution of chloride of sodium acidulated with hydrochloric or sulphuric acid for the liquid of the pulp or plasma of the charge. This is especially advantageous for the following reasons: The acidulated solution acts to free the particles of gold and silver from oxides of the ores or other foreign substances with which they may be coated and prepares them for ready conversion into chlorides by the action of chlorine; also, the hot acidulated solution is especially valuable where small quantities of silver are intimately associated with the gold as is generally the case with gold-bearing ores. Chloride of silver is not readily soluble in a cold solution of chloride of sodium even when slightly acidulated with hydrochloric or sulphuric acid, but when such solution is heated to about 170° Fahrenheit such compound is easily soluble. The hot solution dissolves the particles of chloride of silver as rapidly as they are formed and thus prevents them from remaining upon the surface of the gold and excluding it from the direct action of the chlorine. It is not, however, absolutely necessary for the working of gold ores which carry no appreciable value in silver, that the plasma solution should contain either chloride of sodium or acid, but water may be used as the plasma fluid; but the results in such case will be less satisfactory, and the operations less rapid.

As before stated, I prefer to use nitro-sulphuric acid for the active agent in liberating chlorine in the plasma, containing manganic iron, chloride of sodium and the acidulated brine bath, inasmuch as this acid acts to form nitro-hydrochloric acid in the brine so far as there may be an excess of hydrochloric acid therein, and is a most efficient agent to free the particles of gold and silver from foreign substances and dissolve them. It also assists the liberation of chlorine and supplements the chlorine liberated from the chloride of sodium in the charge. Sulphuric acid may, however, be employed in the place of nitro-sulphuric acid with fair results, but the extraction of the gold and silver will not be as perfect nor will the operation be as expeditious as when the latter is used.

It is also observed that manganic iron of the desired composition for this process is widely distributed throughout gold and silver producing localities; and the fact that it generally carries a small quantity of silver, from two to five ounces per ton, which can be saved by the above described process, reduces its net cost to a trifling figure.

It is further observed that, although I have spoken of this process as specially applicable to refractory ores which require to be roasted or calcined before chlorination, it may be used to advantage with certain ores containing free or float gold in such finely divided or comminuted form that the gold can only be secured with great difficulty by the common processes of amalgamation with mercury.

I do not wish to limit the use of a hot aqueous solution of chloride of sodium slightly acidulated with hydrochloric or sulphuric acid as a pulp or plasma liquid to the special ingredients which make up the charge to be treated or to the use of manganic iron and chloride of sodium mixed with the ores, since this character of bath is valuable when the ores are mixed with chloride of lime, or chloride of sodium, or both, and the manganic iron is absent, especially to free the particles of metal of foreign substances and dissolve the silver chlorides as soon as formed and thereby to obviate the losses in both gold and silver which have heretofore occurred.

What is claimed as new is—

1. The herein described process of chlorinating gold and silver producing ores, which consists in forming a pulp or plasma containing pulverized ores, manganic iron, chloride of sodium and a hot aqueous acidulated solution of chloride of sodium, subjecting the same to agitation in a suitable vessel and introducing a chlorine-liberating acid, whereby chlorine is liberated in the pulp and acts while in a nascent condition to convert the gold and silver into soluble chlorides.

2. In the process of converting gold and silver contained in ores into chlorides, the introduction of small charges of chlorine-liberating acid at frequent intervals at or near the bottom of a digester or vessel containing a pulp or plasma of ores and alkaline metal chlorides, whereby chlorine is liberated at intervals and in such volume that as it rises through the plasma it will unite with the metals and thereby unnecessary waste by escape from the vessel is prevented.

3. The herein described process of extracting gold from its ores which consists in forming a pulp or plasma containing pulverized ores, manganic iron, chloride of sodium and a hot aqueous solution of chloride of sodium and hydrochloric acid, subjecting the same to agitation and treating it with nitro-sulphuric acid, whereby chlorine is liberated and the gold converted into a soluble chloride, filtering the plasma and precipitating the gold from the filtrate.

4. The herein described process of extracting gold and silver from their ores, which consists in forming a pulp or plasma composed of pulverized ores, manganic iron, chloride of sodium and a hot aqueous solution of chloride of sodium and hydrochloric acid, subjecting the same to the action of nitro-sulphuric acid while under agitation, whereby chlorine is liberated and the gold and silver converted into soluble chlorides, filtering the plasma, precipitating the gold from the filtrate and afterward recovering the silver.

5. The herein described process of chlorinating gold and silver-producing ores, which consists in treating a pulp or plasma containing pulverized ores, alkaline metal chlorides, and a hot aqueous acidulated solution of chloride of sodium, with a chlorine-liberating acid and subjecting the same to agitation, whereby chlorine is liberated in the pulp and acts in its nascent condition to convert the gold and silver into chlorides.

6. A digester for treating ores by chlorination, consisting of an upright vessel provided with side walls converging from the bottom upward for the purpose of concentrating the ascending volume of chlorine, a vertically reciprocating agitator, a channel for the introduction of acid at the bottom of the digester, a sluice door and means for opening and closing the same, and a channel near the top of the digester for carrying away any excess of chlorine, substantially as set forth.

7. In a digester for treating ores by chlorination, the combination, substantially as described and shown, with an agitator consisting of a dasher attached to a shaft constructed and arranged to reciprocate vertically in the digester and passing through the top thereof, of a flexible hood whose lower or outer edge is secured to the top of the digester and its central portion is secured gas-tight to the shaft.

JOHN J. CROOKE.

Witnesses:
ROBT. F. GAYLORD,
ERNEST HOPKINSON.